United States Patent
Bonaventura, Jr.

(10) Patent No.: US 6,658,752 B1
(45) Date of Patent: *Dec. 9, 2003

(54) EXTENSIBLE CARPENTER'S LEVEL

(76) Inventor: Anthony L. Bonaventura, Jr., 52 Montrose Ave., Delaware, OH (US) 43015

( * ) Notice: Subject to any disclaimer, the term of this patent is extended or adjusted under 35 U.S.C. 154(b) by 0 days.

This patent is subject to a terminal disclaimer.

(21) Appl. No.: 09/940,302

(22) Filed: Aug. 27, 2001

Related U.S. Application Data

(63) Continuation-in-part of application No. 09/329,871, filed on Jun. 11, 1999, now Pat. No. 6,279,240.
(60) Provisional application No. 60/089,099, filed on Jun. 12, 1998.

(51) Int. Cl.$^7$ .................................. G01C 9/26
(52) U.S. Cl. ................. 33/374; 33/375; 33/451
(58) Field of Search ................ 33/370, 371, 372, 33/373, 374, 375, 376, 296, 451, 809

(56) References Cited

U.S. PATENT DOCUMENTS

| | | | |
|---|---|---|---|
| 2,419,451 A | 4/1947 | Keller ............... 33/374 |
| 3,638,323 A * | 2/1972 | Groe ................ 33/567.1 |
| 4,060,902 A | 12/1977 | Keller ............... 33/403 |
| 4,130,943 A | 12/1978 | Talbot ............... 33/374 |
| 4,317,289 A | 3/1982 | Conn ................ 33/498 |
| 4,435,908 A | 3/1984 | Semler .............. 33/376 |
| 4,593,475 A | 6/1986 | Mayes ............... 33/347 |
| 4,607,437 A | 8/1986 | McSorley ........... 33/374 |
| 4,894,925 A * | 1/1990 | Langmaid ........... 33/374 |
| 4,928,395 A | 5/1990 | Good ................ 33/374 |
| 5,412,875 A * | 5/1995 | Hilderbrandt ....... 33/374 |
| 5,433,011 A * | 7/1995 | Scarborough et al. . 33/376 |
| 5,577,327 A * | 11/1996 | Archambault ....... 33/374 |
| 5,617,641 A * | 4/1997 | Aarhus .............. 33/374 |
| 6,041,510 A | 3/2000 | Huff ................. 33/374 |
| 6,047,478 A * | 4/2000 | Sowers .............. 33/379 |
| 6,279,240 B1 | 8/2001 | Bonaventura ........ 33/374 |
| 6,293,023 B1 * | 9/2001 | Schooley ............ 33/374 |

\* cited by examiner

*Primary Examiner*—Diego Gutierrez
*Assistant Examiner*—R. Alexander Smith
(74) *Attorney, Agent, or Firm*—Standley Law Group LLP

(57) ABSTRACT

The present invention is an extensible carpenter's level that is adjustable between a collapsed position and a fully-extended position. The level may be manufactured in a variety of sizes. An exemplary embodiment of the level is comprised of an innerslide and two outerslides. The innerslide has two sets of tracks or tongues. Each of the outerslides is slidably connected to the innerslide. In particular, one outerslide is adapted to slide along one set of tracks or tongues, and the other outerslide is adapted to slide along the other set of tracks or tongues. At least one of the slides includes at least one level bubble. The level preferably includes multiple level bubbles to enable a variety of measurements, e.g., a horizontal level, a vertical level, and a 45° level.

6 Claims, 24 Drawing Sheets

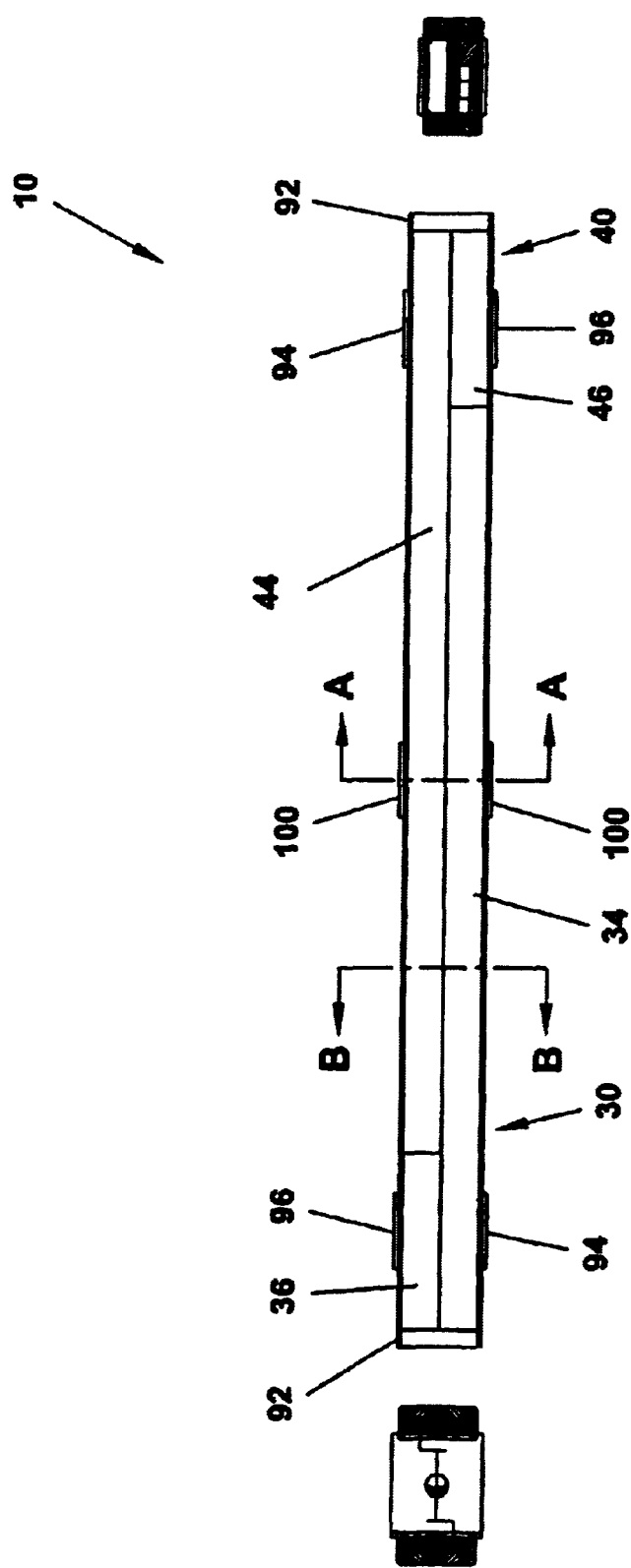

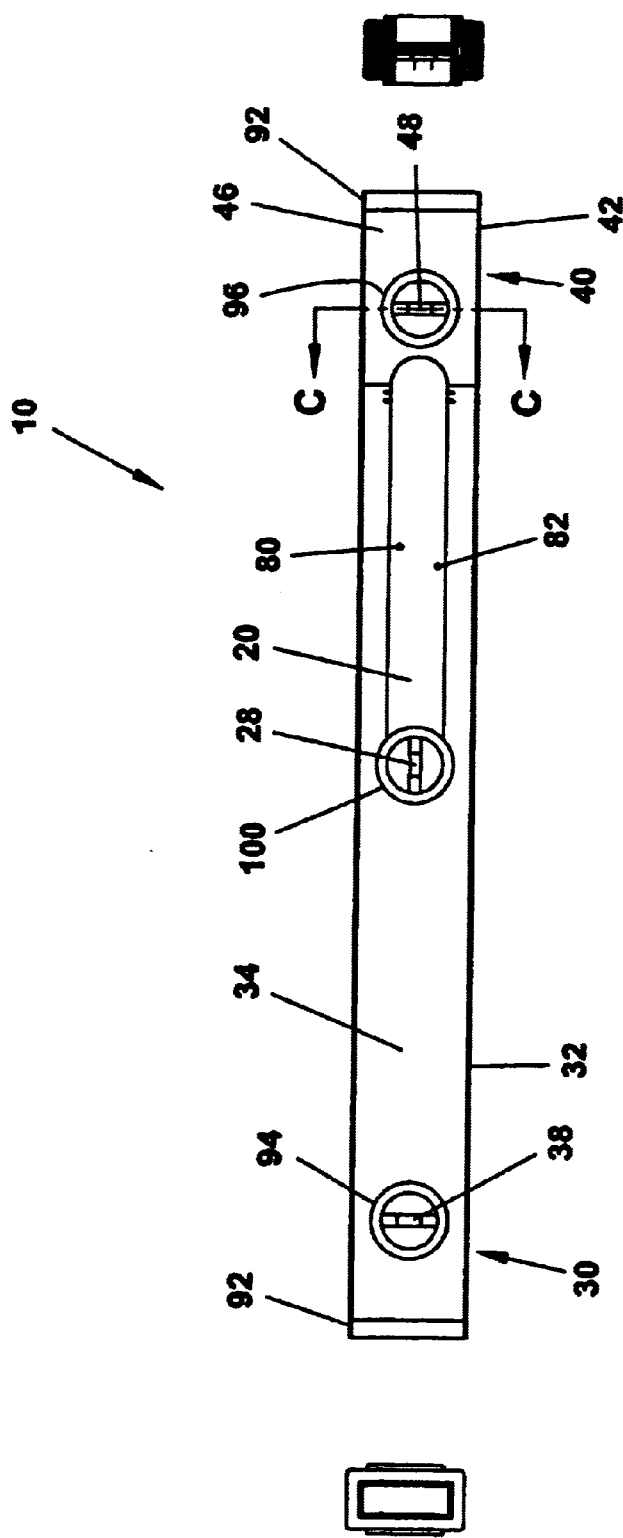

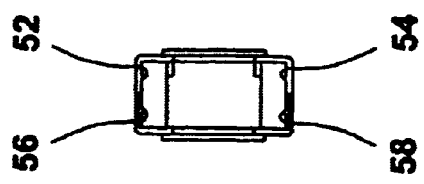

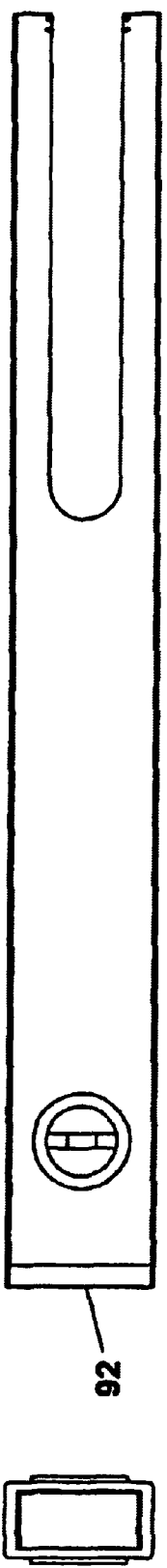
FIG. 6A
FIG. 6B

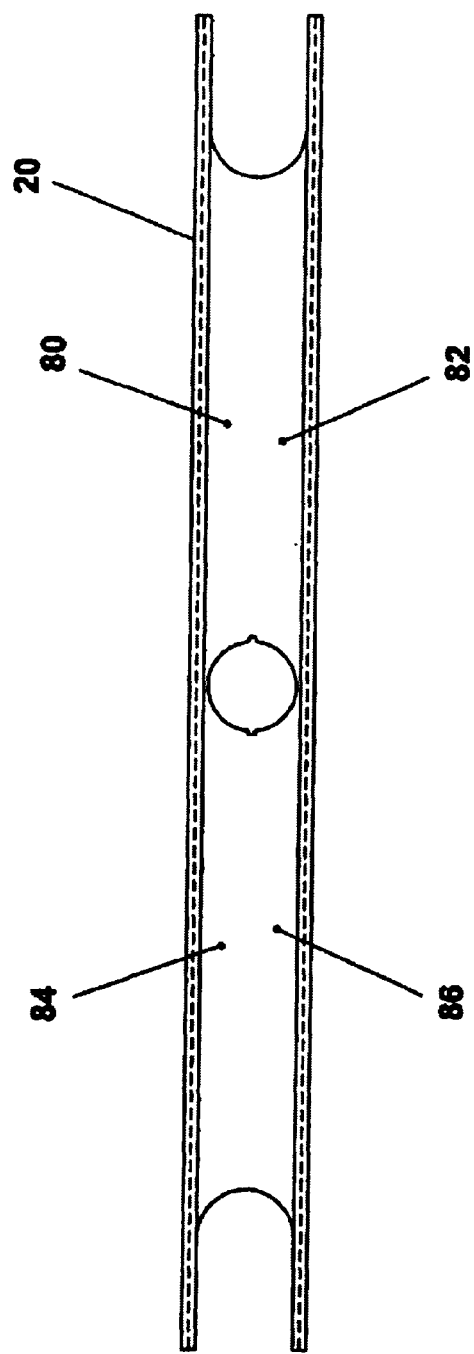
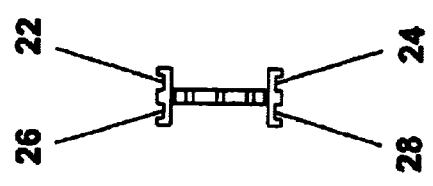

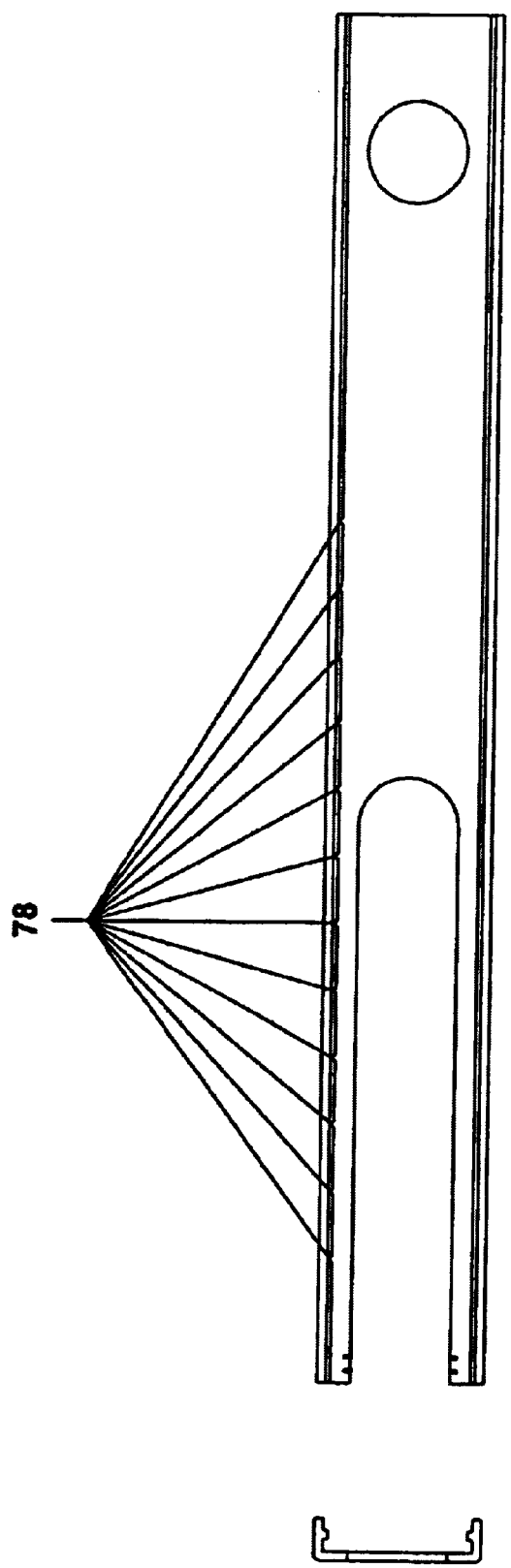

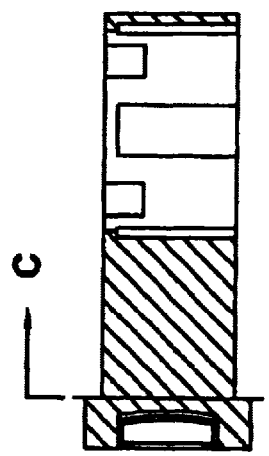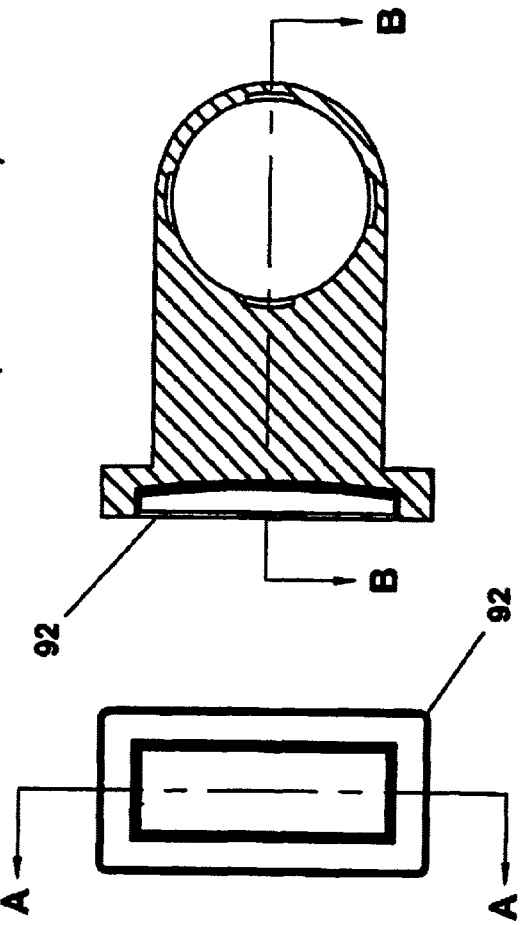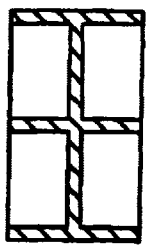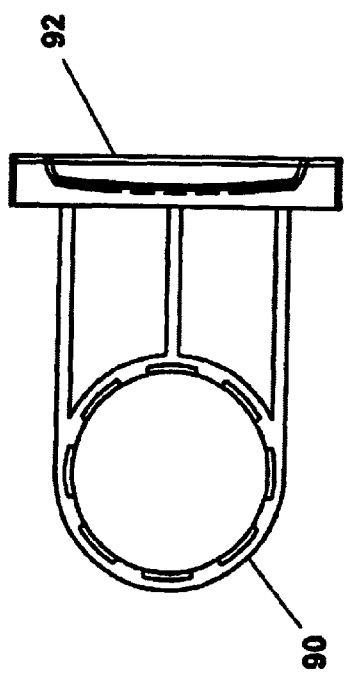
FIG. 10D (SECTION B-B)
FIG. 10C (SECTION A-A)
FIG. 10B
FIG. 10E (SECTION C-C)
FIG. 10A

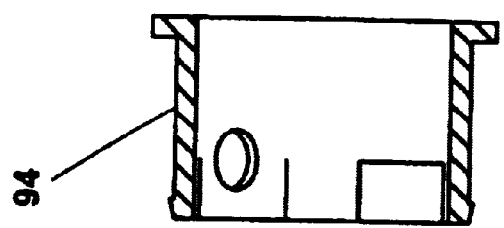
FIG. 11C (SECTION A-A)
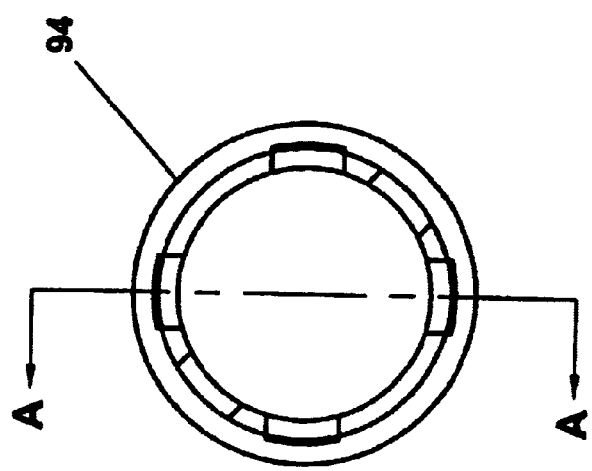
FIG. 11B
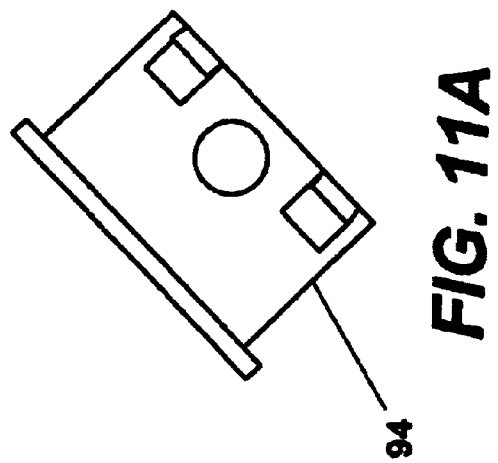
FIG. 11A

(SECTION A-A)

(SECTION A-A)

(SECTION B-B)

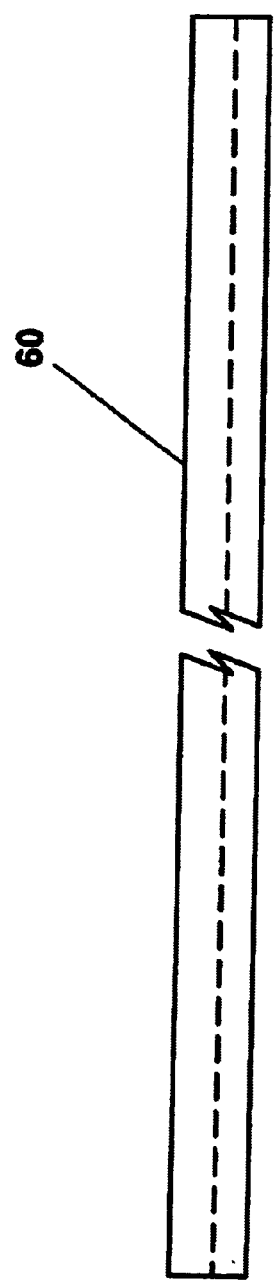
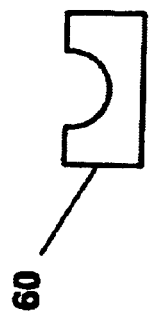
FIG. 14B
FIG. 14A (SECTION A-A)

(SECTION A-A)

EXTENSIBLE CARPENTER'S LEVEL

This application is a continuation-in-part of U.S. application Ser. No. 09/329,871, filed Jun. 11, 1999, now U.S. Pat. No. 6,279,240, which claims the benefit of U.S. Provisional Application No. 60/089,099, filed Jun. 12, 1998.

BACKGROUND AND SUMMARY OF THE INVENTION

The present invention relates generally to a carpenter's level, and more particularly, to an extensible carpenter's level. A carpenter's level may be used to determine the angular position of a given plane or surface relative to a reference plane or surface. A carpenter's level generally includes a level bubble mounted in a housing. The level bubble is mounted in the housing at a predetermined orientation relative to a reference edge of the housing. As a result, the angular position of a surface may be determined by placing the reference edge of the housing against the surface.

In order to achieve optimum accuracy, the length of the reference edge of the housing is preferably about equal to the length of the surface to be checked. If the reference edge is too short, the carpenter's level may be overly sensitive to undulations in the surface. On the other hand, the carpenter's level may be unnecessarily cumbersome if it is too long. Consequently, it is often necessary to have carpenter's levels of varying lengths for a particular job.

Extensible carpenter's levels have been advanced in an attempt to eliminate the need to carry several carpenter's levels of varying lengths. However, known extensible carpenter's levels are unnecessarily complicated and expensive to manufacture. Consequently, a need exists for a stable, extensible carpenter's level which is easy to use and manufacture.

The present invention provides an improved extensible carpenter's level which is slidably adjustable between a collapsed position and a fully-extended position. The reference edges of the level remain substantially aligned in the same plane regardless of the position of the level. An exemplary embodiment of the level includes an innerslide, a first outerslide, and a second outerslide. The innerslide has a first set of tracks and a second set of tracks. The outerslides are slidably connected to the innerslide. The first outerslide and the second outerslide are preferably adapted to slide independently each other. The first outerslide is adapted to slide along the first set of tracks, and the second outerslide is adapted to slide along the second set of tracks. At least one of the slides includes at least one level bubble. Different types of level bubbles may be mounted in the same level to allow for a variety of measurements. For example, one level may include a horizontal level bubble, a vertical level bubble, and a level bubble that measures a predetermined angle, e.g., 30°.

The cross section of the innerslide may be generally I-shaped. The first set of tracks is preferably comprised of a first track on a top side of the innerslide and a second track on a bottom side of the innerslide. In addition, the second set of tracks is preferably comprised of a third track on the top side of the innerslide and a fourth track on the bottom side of the innerslide. However, it should be recognized that the level may have any appropriate number of tracks located in any appropriate positions on the innerslide.

The first outerslide is preferably comprised of a first extension member which is connected to a first end member. The first extension member may be longer than the first end member. The first extension member preferably has a first tongue which is adapted to slide in the first track and a second tongue which is adapted to slide in the second track. On the other hand, the first end member preferably has a third tongue which is adapted to slide in the third track and a fourth tongue which is adapted to slide in the fourth track. The second outerslide is preferably similar to, but opposing, the first outerslide. The second outerslide is preferably comprised of a second extension member which is connected to a second end member. The second extension member may be longer than the second end member. The second extension member preferably has a fifth tongue and a sixth tongue, wherein the fifth tongue is adapted to slide in the third track and the sixth tongue is adapted to slide in the fourth track. Furthermore, the second end member preferably has a seventh tongue which is adapted to slide in the first track and an eighth tongue which is adapted to slide in the second track. The first extension member preferably abuts the second end member and the second extension member preferably abuts the first end member when the carpenter's level is in the collapsed position.

The level may be magnetized. For example, any of the slides may be made from a magnetized material. For another example, one or more magnets may be secured to any of the slides. Preferably, a magnetic strip is adhered to a reference edge of the level. Magnetization preferably helps to hold the reference edge of the level securely against an appropriate surface, e.g., a metal surface, that is being measured. It also preferably helps to prevent the level from falling off a suitable surface during a measurement.

The carpenter's level preferably includes means for releasably locking the position of at least one of the outerslides relative to the innerslide at predetermined intervals. This feature preferably facilitates the use of the level at intermediate lengths between the collapsed position and the fully-extended position. The means may be a spring-loaded ball bearing or pin that is releasably engaged by grooves, cutouts, or notches that are spaced at predetermined intervals on the innerslide or either of the outerslides. It may be preferred that a user can disengage the spring-loaded ball bearing or pin by sliding the outerslide relative to the innerslide.

Another embodiment of the level is similar to the embodiment described above except that the innerslide has tongues. In this embodiment, the innerslide has a first set of tongues and a second set of tongues. The first outerslide is slidably connected to the innerslide, and it is adapted to slide along the first set of tongues. The second outerslide is also slidably connected to the innerslide, and it is adapted to slide along the second set of tongues. At least one of the slides includes at least one level bubble.

The first set of tongues may be comprised of a first tongue on a top side of the innerslide and a second tongue on a bottom side of the innerslide. The second set of tongues may be comprised of a third tongue on the top side of the innerslide and a fourth tongue on the bottom side of the innerslide. In such an embodiment, the first outerslide preferably has a first extension member which is connected to a first end member, and the second outerslide preferably has a second extension member which is connected to a second end member. The first extension member has a first track which is adapted to slide along the first tongue and a second track which is adapted to slide along the second tongue. The first end member has a third track which is adapted to slide along the third tongue. The first end member also has a fourth track which is adapted to slide along the fourth tongue. On the other hand, the second extension member has a fifth track which is adapted to slide along the third tongue and a sixth track which is adapted to slide along the fourth tongue. Furthermore, the second end member has a seventh track which is adapted to slide along the first tongue and an eighth track which is adapted to slide along the second tongue.

This embodiment may also include the optional and preferred features of the first embodiment.

In addition to the novel features and advantages mentioned above, other objects and advantages of the present invention will be readily apparent from the following descriptions of the drawings and exemplary embodiments.

BRIEF DESCRIPTION OF THE DRAWINGS

FIG. 2A is a top plan view of the level of FIG. 1;

FIG. 2B is a cross section view along A—A of FIG. 2A;

FIG. 2C is a cross section view along B—B of FIG. 2A;

FIG. 3A is a side elevation view of the level of FIG. 1;

FIG. 3B is an elevation view of the left end of the level of FIG. 3A;

FIG. 3C is a cross section view along C—C of FIG. 3A;

FIG. 4A is a side elevation view of an outerslide of the level of FIG. 1;

FIG. 4B is an elevation view of the right end of the outerslide of FIG. 4A;

FIG. 6A is another side elevation view of the outerslide of FIG. 4A;

FIG. 6B is an elevation view of the left end of the outerslide of FIG. 6A;

FIG. 7A is a side elevation view of the innerslide of the level of FIG. 1;

FIG. 7B is an elevation view of the left end of the innerslide of FIG. 7A;

FIG. 8A is a side elevation view of an extension member of the outerslide of FIG. 4A;

FIG. 8B is an elevation view of the left end of the extension member of FIG. 8A;

FIG. 10A is a side elevation view of an outerslide mounting assembly for a level bubble of the level of FIG. 1;

FIG. 10B is an elevation view of an end cap of the outerslide mounting assembly of FIG. 10A;

FIG. 10C is a cross section view along A—A of FIG. 10B;

FIG. 10D is a cross section view along B—B of FIG. 10C;

FIG. 10E is a cross section view along C—C of FIG. 10D;

FIG. 11A is a side elevation view of a vial housing which is adapted to be mounted in the outerslide mounting assembly of FIG. 10A;

FIG. 11B is an elevation view of the right end of the vial housing of FIG. 11A;

FIG. 11C is a cross section view along A—A of FIG. 11B;

FIG. 14A is an end elevation view of an optional track member of the innerslide of the level of FIG. 1;

FIG. 14B is a side elevation view of the optional track member of FIG. 14A;

DETAILED DESCRIPTION OF EXEMPLARY EMBODIMENT(S)

Figure 1:
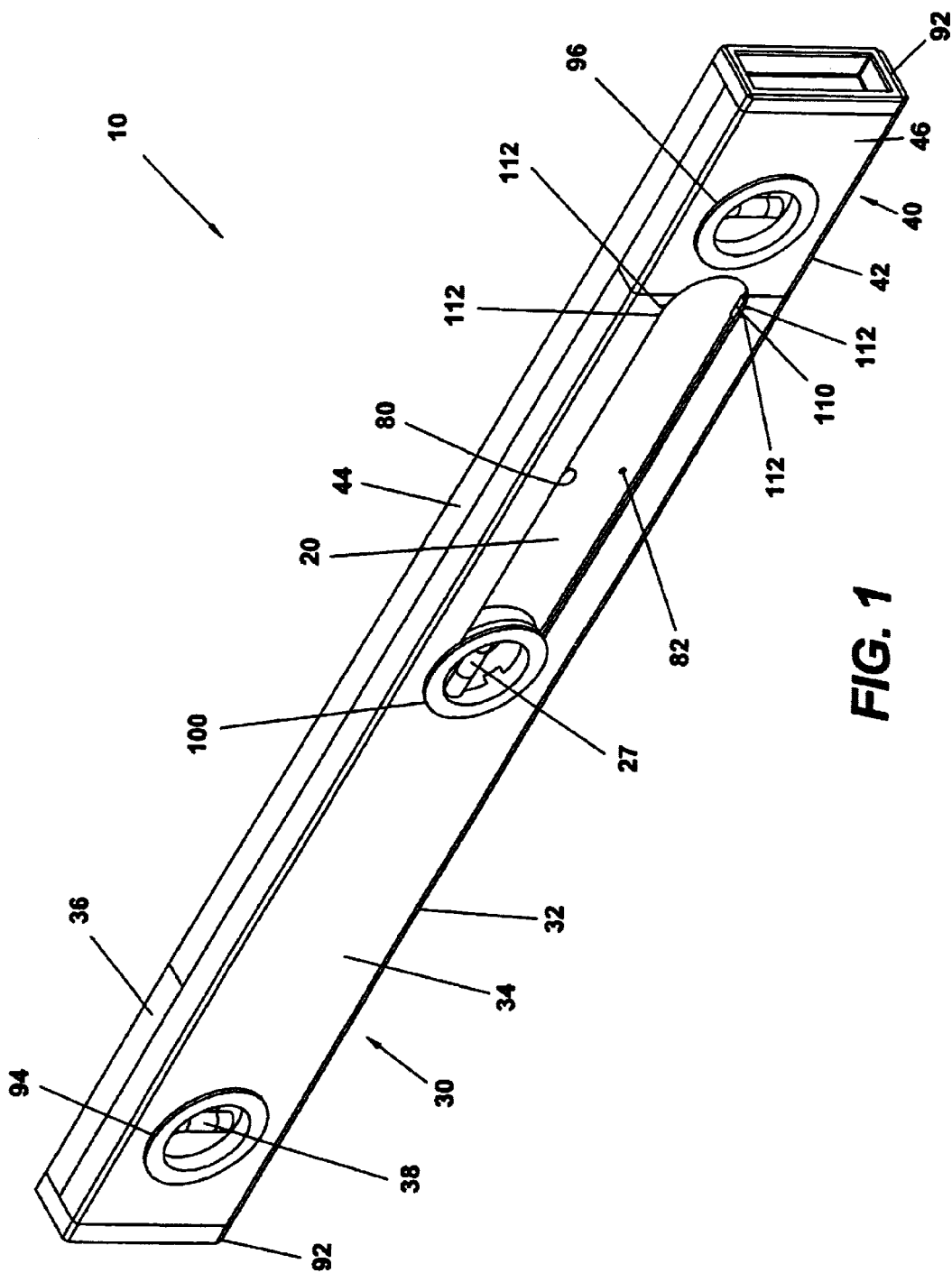
FIG. 1 is a perspective view of a first exemplary embodiment of an extensible carpenter's level of the present invention.
Figure 5:
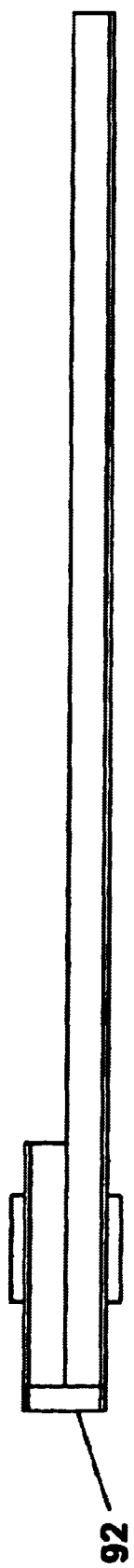
FIG. 5 is a bottom plan view of the outerslide of FIG. 4A.
Figure 9A:
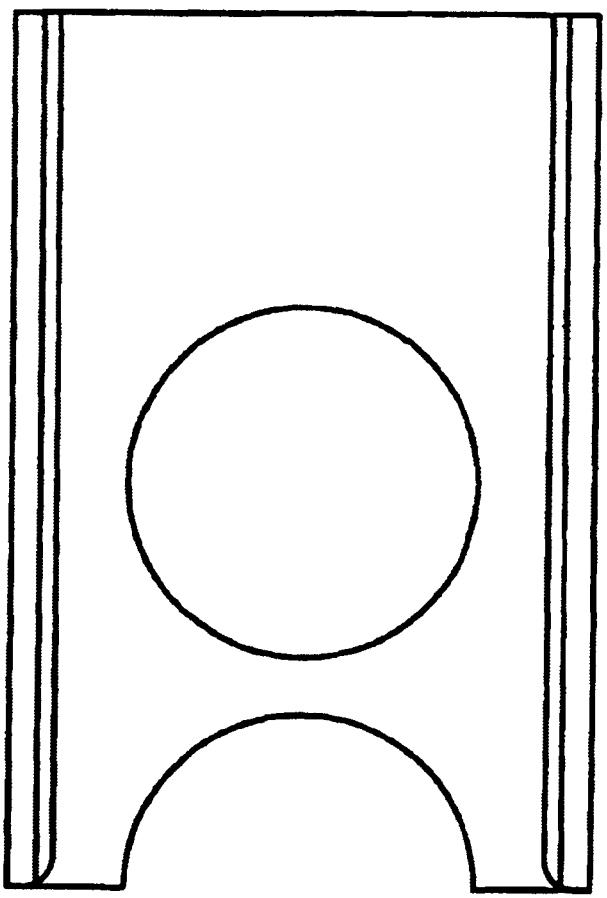
FIG. 9A is a side elevation view of an end member of the outerslide of FIG. 4A.
Figure 9B:
FIG. 9B is an elevation view of the left end of the end member of FIG. 9A.

The present invention is directed to an improved extensible carpenter's level which is slidably adjustable between a collapsed position and a fully extended position. FIGS. 1, 2A–2C, and 3A–3C illustrate an exemplary embodiment of the extensible carpenter's level 10 in a collapsed position. FIGS. 4A–4B, 5, 6A–6B, 7A–7B, 8A–8B, 9A–9B, 10A–10E, 11A–11C, 12A–12B, 13A–13D, 14A–14B, 15A–15C, 16A–16C illustrate various views of the components of the level 10. In this embodiment, the level 10 includes an innerslide 20, a first outerslide 30, and a second outerslide 40. The first outerslide 30 and the second outerslide 40 are slidably connected to the innerslide 20. In addition, the reference edge 32 of the first outerslide 30 and the reference edge 42 of the second outerslide 40 remain substantially aligned in the same plane regardless of the position of the extensible carpenter's level 10.

The slides 20, 30, 40 may be made from any suitable material. For example, the slides 20, 30, 40 may be from metal (e.g., aluminum, steel, or other metals), plastic, or wood. In addition, the slides 20, 30, 40 may be manufactured using any appropriate technique, e.g., extrusion or molding.

In this embodiment, the first outerslide 30 abuts against the second outerslide 40 in the collapsed position. The first outerslide 30 and the second outerslide 40 may be slid independently of one another. The innerslide 20 has a first and second set of tracks. FIG. 7B most clearly shows the tracks. The first set of tracks is comprised of track 22 and track 24, and the second set of tracks is comprised of track 26 and track 28. The first outerslide 30 and the second outerslide 40 have tongues that are adapted to slide in the tracks 22, 24, 26, 28. FIG. 4B shows the tongues 52, 54, 56, 58 of one outerslide. The tongues 52, 54, 56, 58 are adapted to slide in the tracks 22, 24, 26, 28. It should be understood that the tongues 52, 54, 56, 58 can slide in the tracks 22, 24, 26, 28 with or without making contact with the tracks 22, 24, 26, 28. By pulling on opposite ends of the level 10, a user can cause the outerslides 30, 40 to slide in opposite directions relative to the innerslide 20 such that the level 10 moves from the collapsed position into a fully extended position.

FIGS. 14A–14B show an optional track member 60 which may be inserted in the tracks 22, 24, 26, 28. An exemplary embodiment of the track member 60 slidably mates with a corresponding tongue so that the level 10 is stable when it is being adjusted from one position to another. A track member 60 may be secured in each of the tracks 22, 24, 26, 28 by conventional means, e.g., by mechanical fastening means such as screws, pins, clamps, or rivets, by an adhesive, or by any other suitable means. In an alternative embodiment, a track member 60 may be integral to the innerslide 20. FIGS. 2B, 2C, and 3C show an exemplary relationship between the track members 60 and the tongues of the outerslides 30, 40. A track member 60, whether integral to an outerslide or a separate component, may be made from any suitable material such as metal (e.g., aluminum, steel, or other metals), plastic (e.g., TEFLON plastic or any other similar or suitable plastic materials), or wood.

Figure 15C:
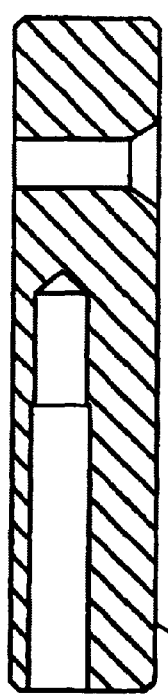
FIG. 15C is a cross section view along A—A of FIG. 15A.
Figure 15A:
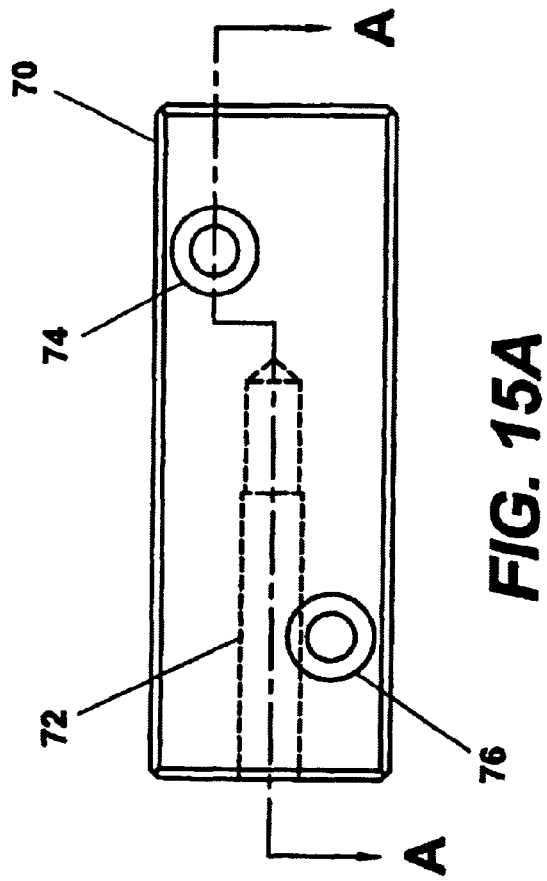
FIG. 15A is a side elevation view of a plunge block of the level of FIG. 1.
Figure 15B:
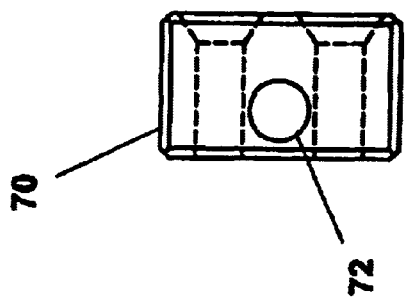
FIG. 15B is an elevation view of the left end of the plunge block of FIG. 15A.

In addition, the extensible carpenter's level 10 may be extendible in increments between a collapsed position and a fully extended position. The extensible carpenter's level 10 may include at least one locking device which is adapted to releasably lock the position of at least one of the outerslides 30, 40 relative to the innerslide 20 at predetermined intervals between the collapsed position and the fully-extended position. An example of a locking device comprises a spring-loaded ball bearing, pin, plunger, or any other suitably-shaped object which is releasably engaged by grooves, notches, or cutouts spaced at predetermined intervals on the innerslide 20 or one of the outerslides 30, 40. FIGS. 15A–15B show various views of an exemplary embodiment of a plunge block 70. The plunge block 70 includes a chamber 72 which is adapted to house a spring-loaded ball bearing, pin, etc. In this embodiment, a plunge block 70 is secured to each side of the innerslide 20 via screws or rivets which extend through hole 74 and hole 76 of each plunge block 70. FIGS. 1, 3A, and 7A show corresponding holes 80, 82, 84, 86 that receive the screws or rivets from the plunge blocks 70. It should also be recognized that a plunge block 70 may be secured to the innerslide 20 or an outerslide by any other appropriate means, e.g., by any other mechanical fastening means, by an adhesive, or by any other similar, suitable, or conventional means. FIGS. 4A and 8A show the notches 78 of one outerslide which are adapted to releasably engage a respective spring-loaded ball bearing as the outerslide slides relative the innerslide 20.

At least one of the slides has a level bubble the innerslide 20, the first outerslide 30, and the second outerslide 40 may each include at least one level bubble. In the embodiment shown in FIGS. 1, the innerslide 20 has a level bubble 28, the first outerslide 30 has a level bubble 38, and the second outerslide 40 has a level bubble 48. In this example, each of the level bubbles may be visible in all collapsed and extended positions. Moreover, the level bubbles are preferably mounted in their respective vial housings at different predetermined orientations relative to the reference edges in order to allow a variety of measurements. For example, one level bubble may function as a horizontal level, a second level bubble may function as a vertical level, and a third level bubble may function as a 45 degree level.

In order to facilitate manufacturing of the extensible carpenter's level 10, the first outerslide 30 and the second outerslide 40 may be substantially identical. In the embodiment shown in FIG. 1, the first outerslide 30 is substantially identical to the second outerslide 40. The first outerslide 30 has an extension member 34, and the second outerslide 40 has an extension member 44. In addition, the first outerslide 30 may have an end member 36, and the second outerslide 40 may have an end member 46.

FIGS. 4A–4B, 5, and 6A–6B illustrate an outerslide which is representative of both the first outerslide 30 and the second outerslide 40 of the extensible carpenter's level 10 of FIGS. 1 through 3. FIGS. 8A–8B show an extension member of the outerslide of FIGS. 4A–4B, 5, and 6A–6B, and FIGS. 9A–9B illustrate an end member of the outerslide of FIGS. 4A–4B, 5, and 6A–6B. FIGS. 7A–7B show the innerslide 20 of the extensible carpenter's level 10.

Figure 12B:
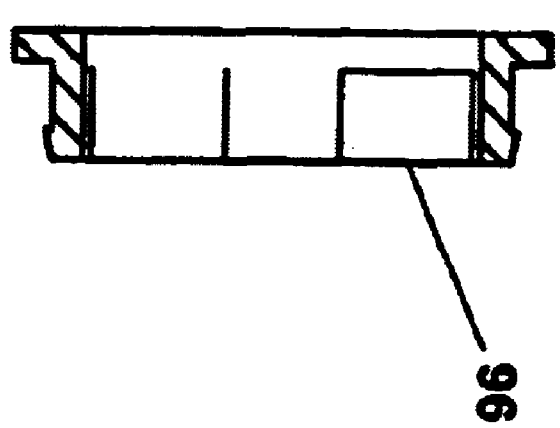
FIG. 12B is a cross section view along A—A of FIG. 12A.
Figure 12A:
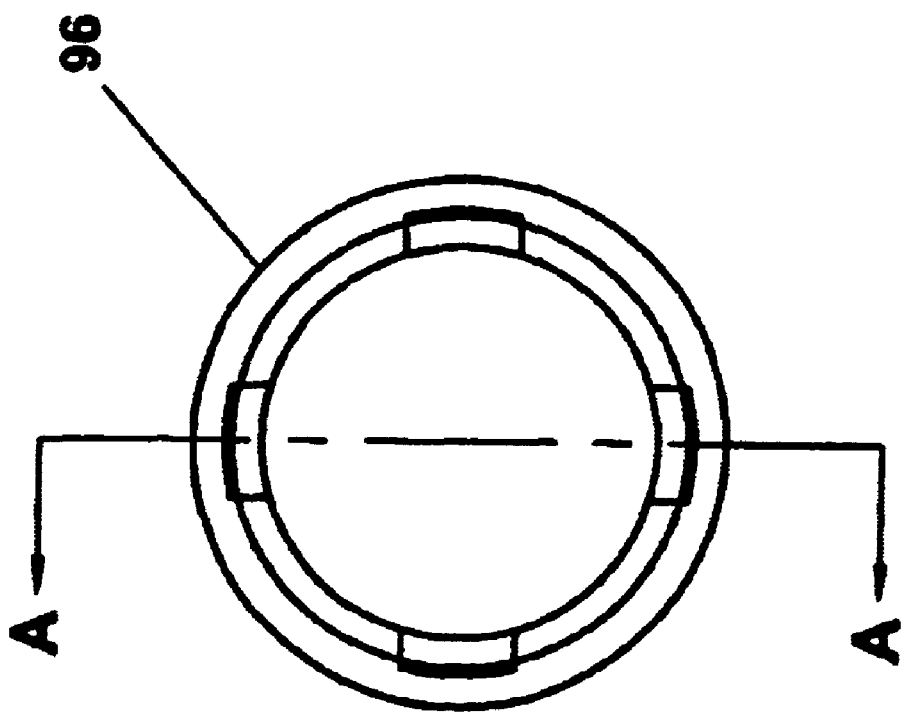
FIG. 12A is an elevation view of an end of a vial housing mate for the vial housing of FIG. 11A.
Figure 13C:
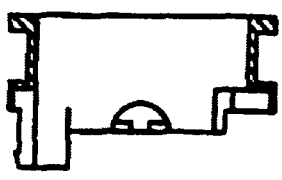
FIG. 13C is a cross section view along A—A of FIG. 13B.
Figure 13D:
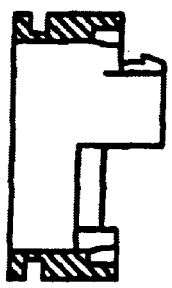
FIG. 13D is a cross section view along B—B of FIG. 13B.
Figure 13B:
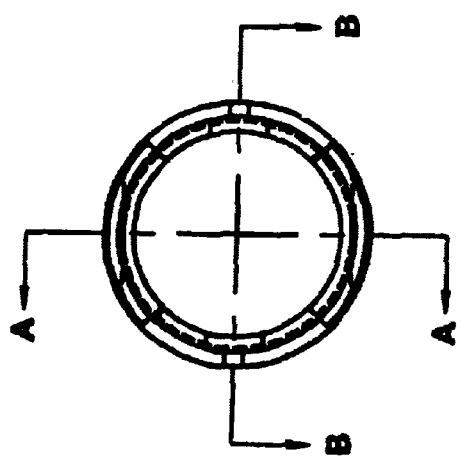
FIG. 13B is an elevation view of an end of the vial housing of FIG. 13A.
Figure 13A:
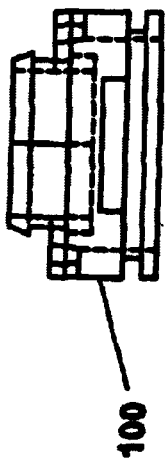
FIG. 13A is a side elevation view of a vial housing which is adapted to be mounted on the innerslide of the level of FIG. 1.

FIGS. 10A–10E show an outerslide mounting assembly 90 for a level bubble. The outerslide mounting assembly 90 includes an end cap 92. The end cap 92 may be made of any suitable material such as metal, plastic (e.g., rubber), or any other similar or conventional material. FIGS. 11A–11C show a vial housing 94, and FIGS. 12A–12B show a vial housing mate 96. Vial housing 94 and vial housing mate 96 are adapted to be mounted in the outerslide mounting assembly 90. The outerslide mounting assembly 90, vial housing 94, and vial housing mate 96 may be adapted to secure the end members to the extension members of the outerslides. However, it should be recognized that an extension member may be integrally connected to an end member. It should also be recognized that an end member may be connected to an extension member in other similar, suitable, or conventional manner.

FIGS. 13A–13D show another vial housing 100 which is adapted to be mounted on the innerslide 20.

A transparent shield, e.g., glass or plastic, may extend over the vial housings to protect the level bubbles. Also, the vial housings may be raised from, flush with, or below the surface of the outerslides.

Figure 16C:
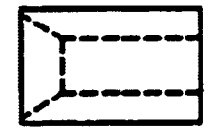
FIG. 16C is an elevation view of an end of the stop of FIG. 16A.
Figure 16A:
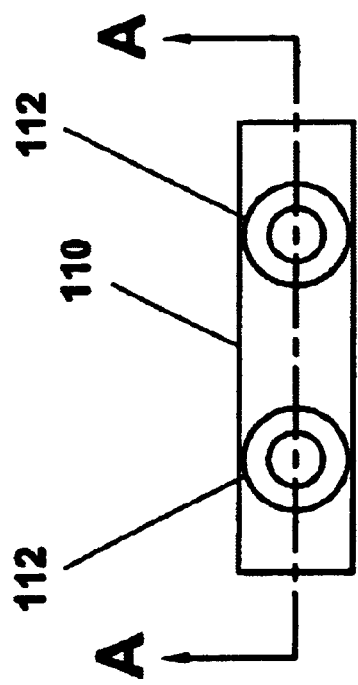
FIG. 16A is a side elevation view of a stop of the level of FIG. 1.
Figure 16B:
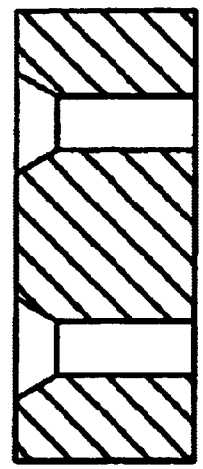
FIG. 16B is a cross section view along A—A of FIG. 16A.

FIGS. 16A–16C show a stop 110. Stops 110 may be adapted to abut respective plunge blocks 70 in the fully extended position. In this embodiment, the stops 110 are secured to the extension members by screws, rivets, or any other mechanical fastening means through holes 112. However, it should be recognized that the stops 110 may be secured to the extension members by any suitable means, e.g., integrally connected, by an adhesive, or in any other similar, suitable, or conventional manner.

Figure 17:
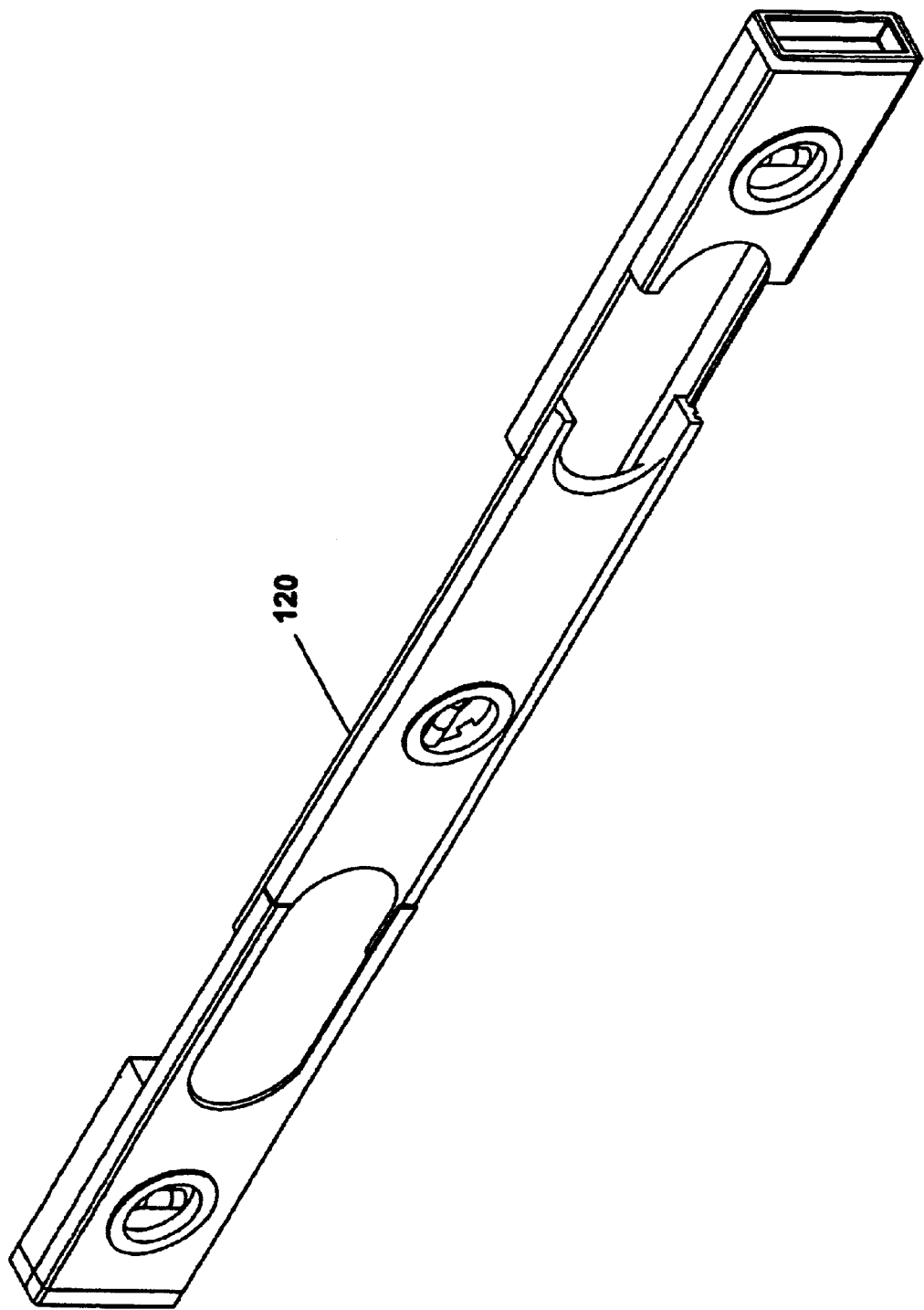
FIG. 17 is a perspective view of a second exemplary embodiment of a level of the present invention in a fully-extended position.

FIG. 17 shows another embodiment of a level 120 of the present invention in a fully extended position. The level 120 may include any of the optional or preferred features described above.

Figure 18:
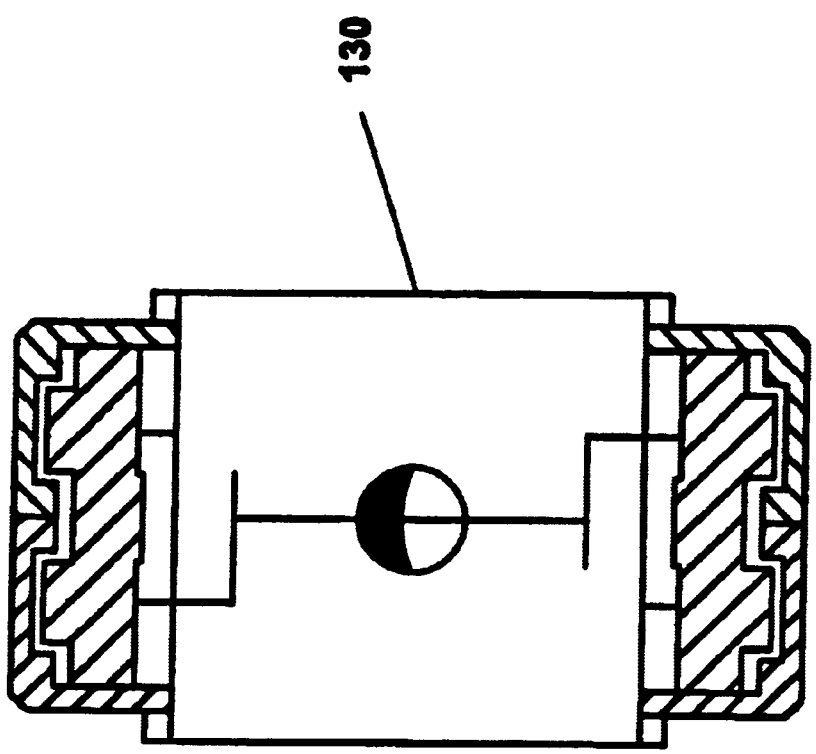
FIG. 18 is a cross section view of a third exemplary embodiment of a level of the present invention.

FIG. 18 shows another embodiment of a level 130 of the present invention in which the innerslide has tongues and the outerslides have tracks. The level 130 may include any of the optional or preferred features described above.

Figure 19:
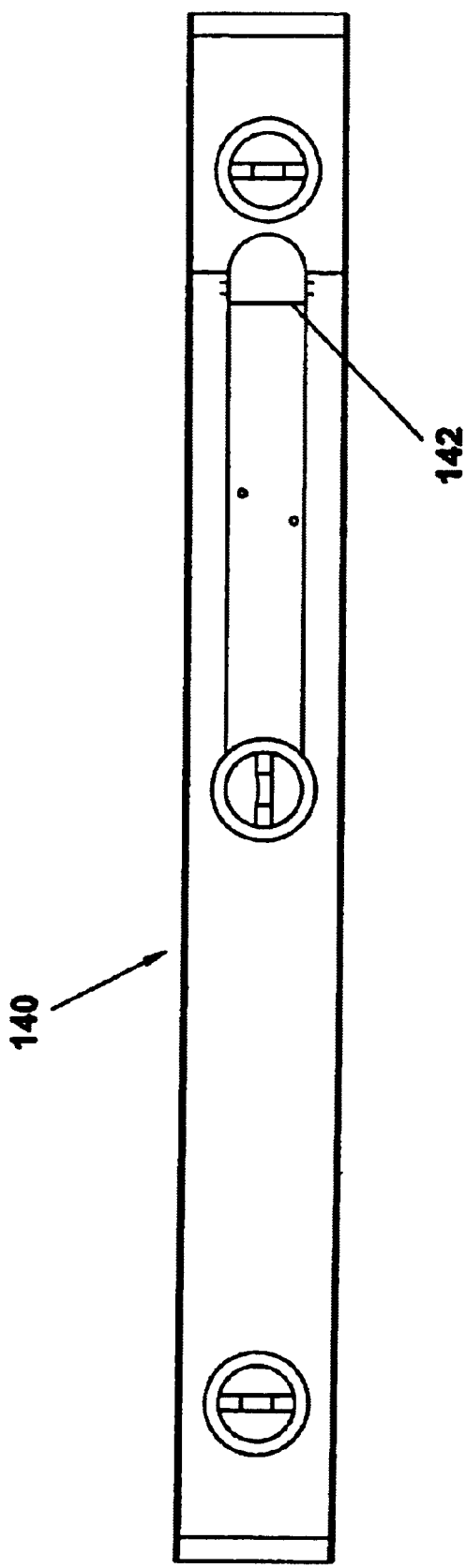
FIG. 19 is a side elevation view of a fourth exemplary embodiment of a level of the present invention.
Figure 20:
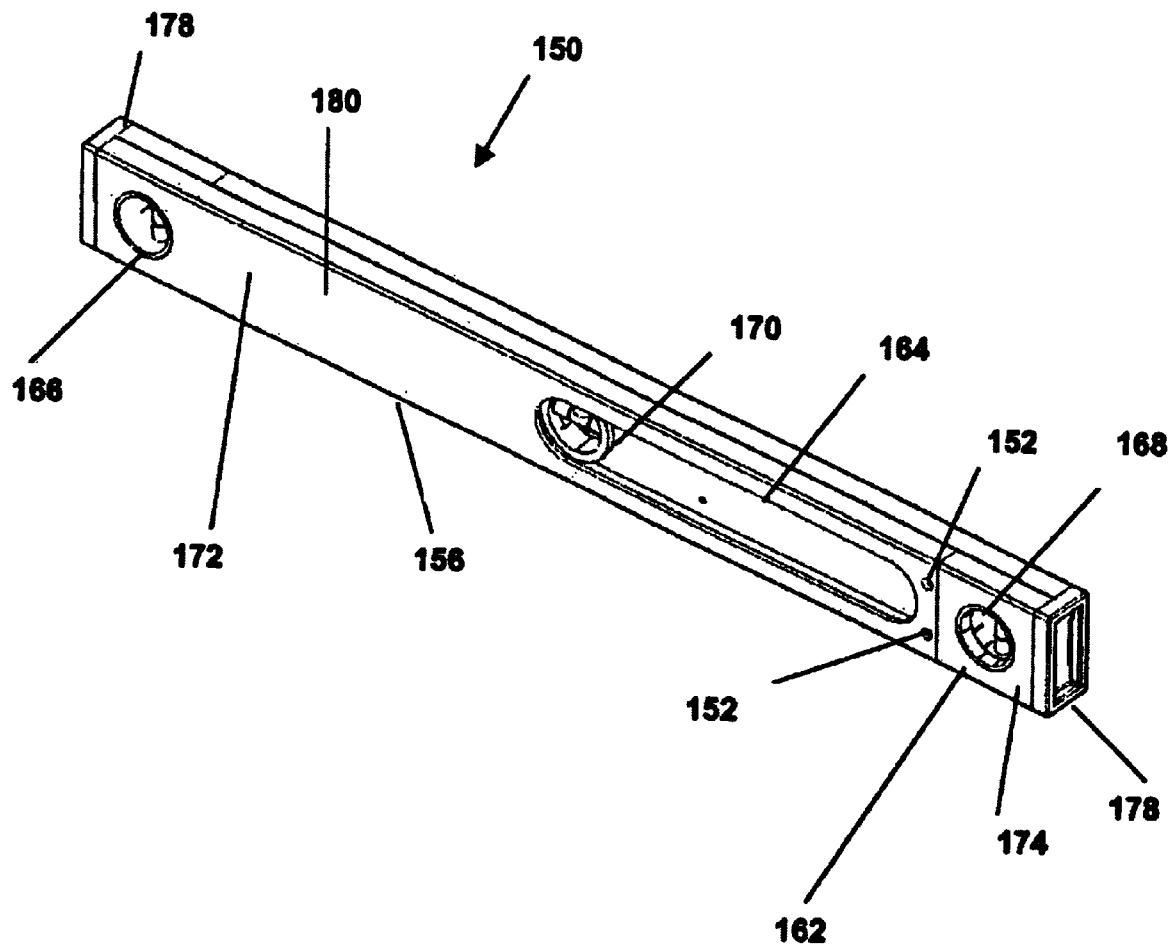
FIG. 20 is a perspective view of a fifth exemplary embodiment of an extensible carpenter's level of the present invention.
Figure 21:
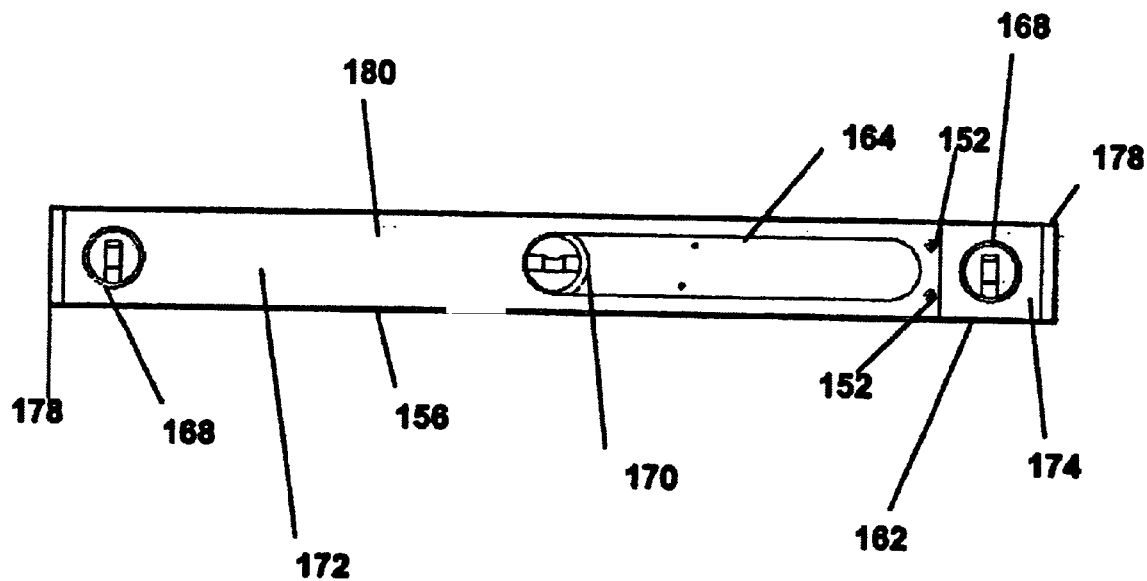
FIG. 21 is a side elevation view of the level of FIG. 20.

FIG. 19 shows yet another embodiment of a level 140 of the present invention in which a stop 142 extends from a top portion to a bottom portion of an extension member. The level 140 may include any of the optional or preferred features described above.

FIGS. 20 through 24 show another example of a level 150 of the present invention in which a stop extends from a top portion to a bottom portion of an extension member. The level 150 may include any of the above-described optional or preferred features. In this example, rivets or screws 152 secure a stop 154 to an extension member 156. Nevertheless, it should be recognized that the stop 154 may be secured to the extension member 156 by any desired means including, but not limited to, integral connection, adhesives, other mechanical fastening means, or any other similar, suitable, or conventional connection or fastening means.

In this example, an end portion 158 connects the top and bottom portions of the extension member 156. The end portion 158 may abut the end portion 160 of end member 162 when the level is in a collapsed position. The end portion 158 may define at least a portion of a cutout or opening 164 of the extension member 156. As shown in the exemplary embodiment, the cutout or opening 164 may be adapted to enable a centrally located level bubble to be seen regardless of the position of the level 150.

Figure 22:
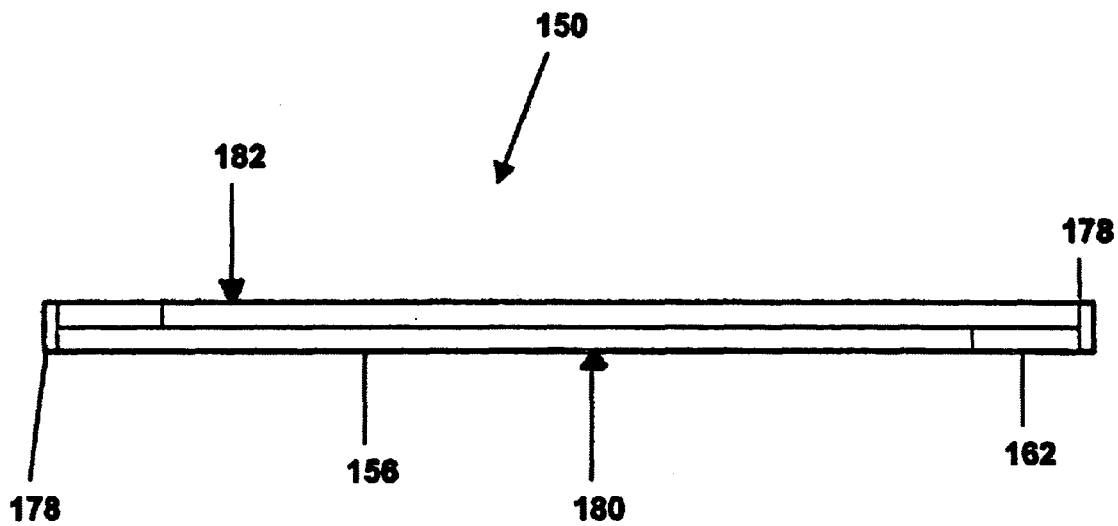
FIG. 22 is a top plan view of the level of FIG. 20.
Figure 23:
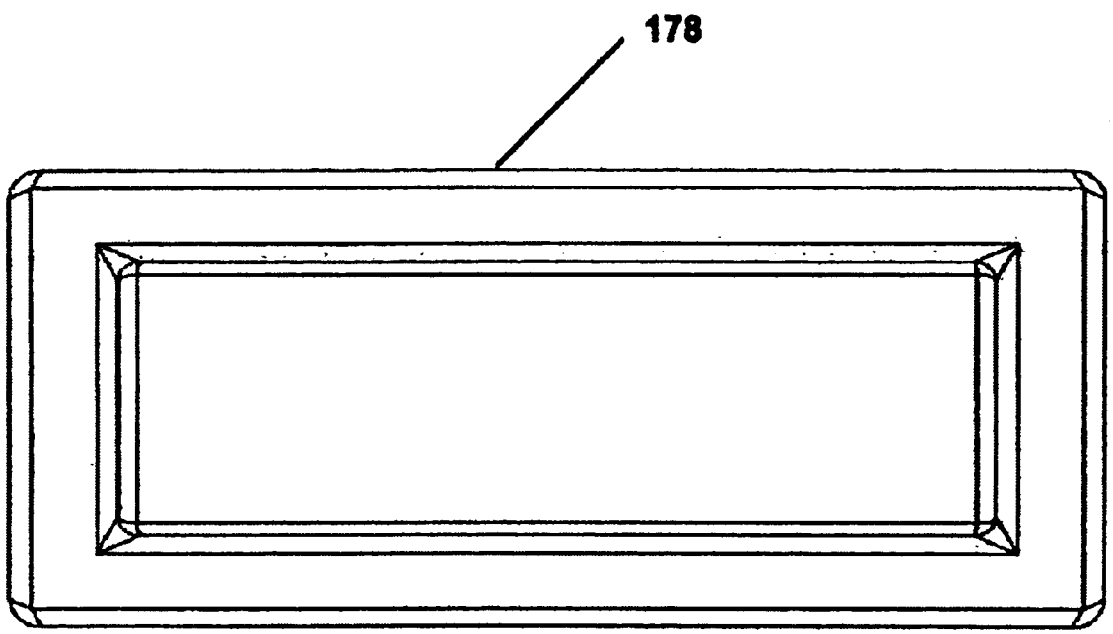
FIG. 23 is an end elevation view of the level of FIG. 20.
Figure 24:
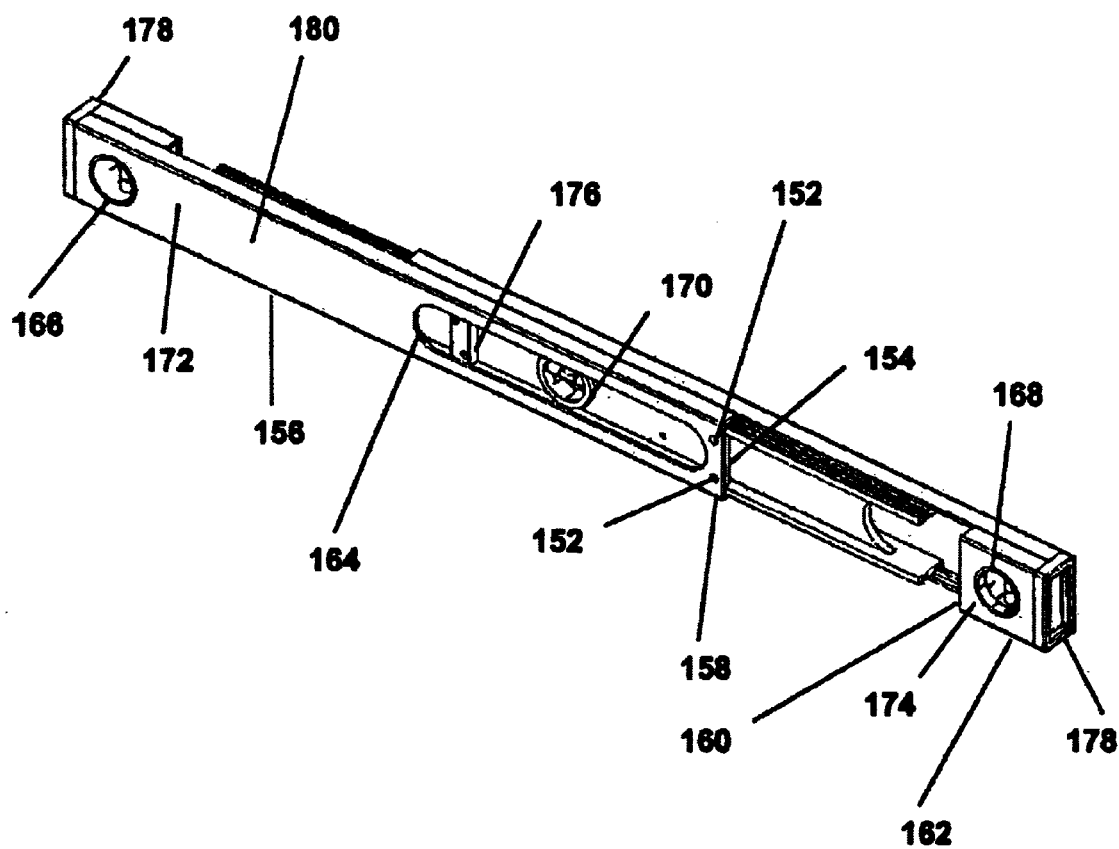
FIG. 24 is a perspective view of the level of FIG. 20 in an open position.

The vial housing 166, the vial housing mate 168, and the vial housing 170 may be about flush with or recessed from an outer surface 172 of the extension member 156 and an outer surface 174 of the end member 162. Such an arrangement may facilitate laying the level 150 substantially flat against a surface when taking a measurement or using the level 150 like a ruler, e.g., using a reference edge to draw a straight line. In this example, the vial housing 166 is about flush with the outer surface 172, and the vial housing mate 168 is about flush with the outer surface 174. On the other hand, the vial housing 170 is recessed from the outer surface 172. As seen in FIG. 22, this arrangement provides the level 150 with substantially flat sides.

In operation, the level 150 may be adjusted by sliding the extension member 156 away from the end member 162. As the members are slid apart, the stop 154 passes by an outer surface of the vial housing 170. If the sliding movement is continued, the stop 154 eventually abuts a plunge block 176, thereby preventing further sliding movement in that direction.

Each end of the level 150 may include an end cap 178. The end cap 178 may be comprised of any suitable material including, but not limited to, metal, plastic, wood, or any other similar, suitable, or conventional material. For example, the end cap 178 may be comprised of rubber to help protect the level 150 from damage in the event it is dropped.

The level 150 may have opposing lateral sides 180, 182. As in the previously described embodiments, each of the three level bubbles may be viewed substantially without obstruction (i.e., the readings of the level bubbles are visible) when looking at lateral side 180 or lateral side 182 regardless of the adjusted position of the level 150. As a result, either side of the level 150 may be used equally well and without limitation. Moreover, as shown in the figures, the distance separating the level bubbles may be adjusted substantially without obstructing the view of the level bubbles from either lateral side.

Those skilled in the art will recognize that the present invention may have any desired dimensions (lengths, widths, heights, etc.). For example, the length of one embodiment of the present invention may be adjustable between 6 inches and 12 inches, and the length of another embodiment of the present invention may be adjustable between 4 feet and 8 feet. In other words, a level of the present invention may be designed to be adjustable within any desired range.

The exemplary embodiments herein disclosed; are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A level adjustable between a collapsed position and a fully-extended position, said level comprising:

an innerslide having a first set of tracks and a second set of tracks, said first set of tracks comprised of a first track on a top side of said innerslide and a second track on a bottom side of said innerslide, said second set of tracks comprised of a third track on said top side of said innerslide and a fourth track on said bottom side of said innerslide;

a first outerslide slidably connected to said innerslide, said first outerslide adapted to slide along said first set of tracks, said first outerslide including a first level bubble, said first outerslide further including a first extension member and a first end member, said first extension member connected to said first end member, said first extension member having a first tongue which is adapted to slide in said first track, said first extension member also having a second tongue which is adapted to slide in said second track, said first end member having a third tongue which is adapted to slide in said third track, said first end member also having a fourth tongue which is adapted to slide in said fourth track; and a second outerslide slidably connected to said innerslide, said second outerslide adapted to slide along said second set of tracks, said second outerslide including a second level bubble, said second outerslide further including a second extension member and a second end member, said second extension member connected to said second end member, said second extension member having a fifth tongue which is adapted to slide in said third track, said second extension member also having a sixth tongue which is adapted to slide in said fourth track, said second end member having a seventh tongue which is adapted to slide in said first track, said second end member also having an eighth tongue which is adapted to slide in said second track;

wherein the level has opposing lateral sides;

wherein the distance separating said first level bubble from said second level bubble is adjustable; and wherein both said first level bubble and said second level bubble are visible substantially without obstruction from both of said lateral sides regardless of the adjusted position of the level.

2. The level of claim 1 wherein said first extension member abuts said second end member and said second extension member abuts said first end member when said level is in said collapsed position.

3. The level of claim 1 wherein:

said first extension member is longer than said first end member; and said second extension member is longer than said second end member.

4. A level adjustable between a collapsed position and a fully-extended position, said level comprising:

an innerslide having a first set of tongues and a second set of tongues, said first set of tongues comprised of a first tongue on a top side of said innerslide and a second tongue on a bottom side of said innerslide, said second set of tongues comprised of a third tongue on said top side of said innerslide and a fourth tongue on said bottom side of said innerslide;

a first outerslide slidably connected to said innerslide, said first outerslide adapted to slide along said first set of tongues, said first outerslide including a first level bubble, said first outerslide further including a first extension member and a first end member, said first extension member connected to said first end member, said first extension member having a first track which is adapted to slide along said first tongue, said first extension member also having a second track which is adapted to slide along said second tongue, said first end member having a third track which is adapted to slide along said third tongue, said first end member also having a fourth track which is adapted to slide along said fourth tongue; and a second outerslide slidably connected to said innerslide, said second outerslide adapted to slide along said second set of tongues, said second outerslide including a second level bubble, said second outerslide further including a second extension member and a second end member, said second extension member connected to said second end member, said second extension member having a fifth track which is adapted to slide along said third tongue, said second extension member also having a sixth track which is adapted to slide along said fourth tongue, said second end member having a seventh track which is adapted to slide along said first tongue, said second end member also having an eighth track which is adapted to slide along said second tongue;

wherein the level has opposing lateral sides;

wherein the distance separating said first level bubble from said second level bubble is adjustable; and wherein both said first level bubble and said second level bubble are visible substantially without obstruction from both of said lateral sides regardless of the adjusted position of the level.

5. The level of claim 4 wherein said first extension member abuts said second end member and said second extension member abuts said first end member when said level is in said collapsed position.

6. The level of claim 4 wherein:

said first extension member is longer than said first end member; and said second extension member is longer than said second end member.

* * * * *

UNITED STATES PATENT AND TRADEMARK OFFICE
CERTIFICATE OF CORRECTION

PATENT NO. : 6,658,752 B1  
DATED : December 9, 2003  
INVENTOR(S) : Anthony L. Bonaventura, Jr.

It is certified that error appears in the above-identified patent and that said Letters Patent is hereby corrected as shown below:

Column 5,
Line 61, please delete "At least one of the slides has a level bubble the innerslide" and insert -- At least one of the slides has a level bubble. The innerslide --

Signed and Sealed this

Twenty-fourth Day of February, 2004

JON W. DUDAS  
*Acting Director of the United States Patent and Trademark Office*